United States Patent
Oh et al.

(10) Patent No.: US 12,151,611 B2
(45) Date of Patent: Nov. 26, 2024

(54) LIGHTING DEVICE WITH GARNISH BODY

(71) Applicants: HYUNDAI MOTOR COMPANY, Seoul (KR); KIA CORPORATION, Seoul (KR); NIFCO KOREA INC., Asan-si (KR); HYUNDAI MOBIS CO., LTD., Seoul (KR)

(72) Inventors: Jun Geun Oh, Hwaseong-si (KR); Min Ha Lee, Seongnam-si (KR); Kyu Rok Kim, Hwaseong-si (KR); Byoung Wook Kim, Gunpo-si (KR); Hoe Won Jung, Asan-si (KR); Ho Sung Shin, Asan-si (KR); Seong Cheon Cho, Yongin-si (KR)

(73) Assignees: HYUNDAI MOTOR COMPANY, Seoul (KR); KIA CORPORATION, Seoul (KR); NIFCO KOREA INC., Asan-si (KR); HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/242,130

(22) Filed: Sep. 5, 2023

(65) Prior Publication Data
US 2024/0083351 A1    Mar. 14, 2024

(30) Foreign Application Priority Data

Sep. 8, 2022 (KR) .......... 10-2022-0114335
Aug. 16, 2023 (KR) .......... 10-2023-0106614

(51) Int. Cl.
*B60Q 3/62* (2017.01)
*B60Q 3/54* (2017.01)
*B60Q 3/64* (2017.01)
*B60Q 3/78* (2017.01)
*F21V 8/00* (2006.01)

(52) U.S. Cl.
CPC ........... *B60Q 3/62* (2017.02); *B60Q 3/54* (2017.02); *B60Q 3/64* (2017.02); *B60Q 3/78* (2017.02); *G02B 6/0051* (2013.01); *G02B 6/0055* (2013.01); *G02B 6/0058* (2013.01)

(58) Field of Classification Search
CPC ... B60Q 3/54; B60Q 3/62; B60Q 3/64; B60Q 3/78; F21S 41/24; F21S 43/235; F21S 43/237; F21V 5/04
See application file for complete search history.

(56) References Cited

U.S. PATENT DOCUMENTS

| | | | |
|---|---|---|---|
| 2014/0211493 A1* | 7/2014 | Ichikawa | F21V 7/0025 362/511 |
| 2017/0174125 A1* | 6/2017 | Katsurayama | G02B 6/0006 |
| 2019/0001878 A1* | 1/2019 | Schneider | G09F 21/049 |

FOREIGN PATENT DOCUMENTS

| | | | | |
|---|---|---|---|---|
| KR | 2010-0055260 A | | 5/2010 | |
| KR | 20220120287 A | * | 8/2022 | ............. G02B 6/005 |

* cited by examiner

*Primary Examiner* — Keith G. Delahoussaye
(74) *Attorney, Agent, or Firm* — MCDONNELL BOEHNEN HULBERT & BERGHOFF LLP

(57) ABSTRACT

A lighting device includes a light guide plate configured to guide and diffuse a light from a light source, and a garnish body including a lighting area to which the diffused light is radiated, wherein the light guide plate is disposed at a predetermined angle with respect to the garnish body.

19 Claims, 11 Drawing Sheets dollar# LIGHTING DEVICE WITH GARNISH BODY

CROSS REFERENCE TO RELATED APPLICATIONS

The present application claims priority to Korean Patent Application No. 10-2022-0114335, filed Sep. 8, 2022, and Korean Patent Application No. 10-2023-0106614, filed Aug. 16, 2023, the entire contents of which is incorporated herein for all purposes by this reference.

TECHNICAL FIELD

The present disclosure relates to a lighting device.

BACKGROUND

Recently, for interior lighting of a vehicle, a mood light which may enhance interior aesthetics in addition to performing a general lighting function is expanding its application. An example function of the mood light is to provide a gradient lighting effect on a garnish in a vehicle compartment.

In a gradient mood light, an LED is mounted at an end portion of a lighting device. When a primary ray from the LED passes through a light guide, the entire light guide emits light, rendering a secondary ray to be radiated to a reflective surface (e.g., a mold cover, a leather skin surface, etc.). Then a tertiary ray, formed by the secondary ray being diffusely reflected by the surface roughness of the reflective surface, is recognized by passenger's eyes by being adjusted in amount depending on physical conditions, such as the width, angle, and separation distance between the light guide and the reflective surface, providing gradient lighting.

However, it is difficult to induce diffuse reflection on a member, such as a high gloss surface. In addition, such a surface of the member absorbs light and has a very low reflectivity, so the gradient lighting effect cannot be realized by the lighting method in the related art.

The above information disclosed in this Background section is only for enhancement of understanding of the background of the present disclosure, and therefore it may contain information that does not form the related art that is already known to a person of ordinary skill in the art.

SUMMARY

The present disclosure has been made in an effort to solve the above-described problems associated with the related art, and it is an object of the present disclosure to provide a lighting device capable of providing a rich and varied indoor atmosphere using a gradient lighting effect.

Another object of the present disclosure is to provide a lighting device capable of securing the visibility for mood lighting in a daytime outdoor environment where the visibility for lighting is poor.

A further object of the present disclosure is to provide a lighting device capable of enhancing the emotional quality of a vehicle.

The object of the present disclosure is not limited to the foregoing, and other objects not mentioned herein will be clearly understood by one having ordinary skill in the art to which the present disclosure pertains based on the description below.

The features of the present disclosure to achieve the object of the present disclosure as described above and perform the characteristic functions of the present disclosure to be described later are as follows.

In one aspect, the present disclosure provides a lighting device including a light guide plate configured to guide and diffuse a light from a light source, and a garnish body including a lighting area to which the diffused light is radiated. The light guide plate may be disposed at a predetermined angle with respect to the garnish body.

Other aspects and preferred embodiments of the present disclosure are discussed infra.

It is to be understood that the term "vehicle" or "vehicular" or other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, a vehicle powered by both gasoline and electricity.

The above and other features of the present disclosure are discussed infra.

BRIEF DESCRIPTION OF THE FIGURES

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
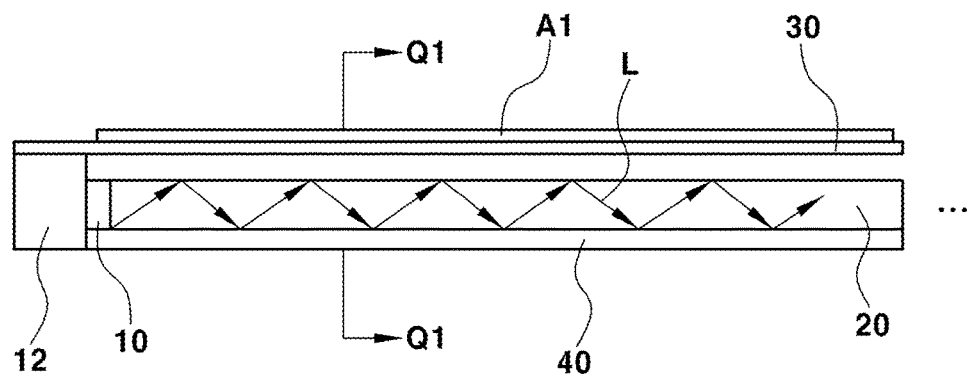
FIG. 1 is a schematic cross-sectional view of a lighting device according to an embodiment of the present disclosure.

It should be understood that the appended drawings are not necessarily to scale, presenting a somewhat simplified representation of various preferred features illustrative of the basic principles of the present disclosure. The specific design features of the present disclosure, including, for example, specific dimensions, orientations, locations, and shapes, will be determined in part by the particular intended application and usage environment.

In the figures, the reference numbers refer to the same or equivalent parts of the present disclosure throughout the several figures of the drawing.

DETAILED DESCRIPTION

Descriptions of specific structures or functions presented in the embodiments of the present disclosure are merely exemplary for the purpose of explaining the embodiments according to the concept of the present disclosure, and the embodiments according to the concept of the present disclosure may be implemented in various forms. In addition, the descriptions should not be construed as being limited to the embodiments described herein, and should be understood to include all modifications, equivalents and substitutes falling within the idea and scope of the present disclosure.

Meanwhile, in the present disclosure, terms such as "first" and/or "second" may be used to describe various components, but the components are not limited by the terms. These terms are only used to distinguish one component from another. For example, a first component could be termed a second component, and similarly, a second component could be termed a first component, without departing from the scope of exemplary embodiments of the present disclosure.

It will be understood that, when a component is referred to as being "connected to" another component, the component may be directly connected to the other component, or intervening components may also be present. In contrast, when a component is referred to as being "directly connected to" another component, there is no intervening component present. Other terms used to describe relationships between components should be interpreted in a like fashion (e.g., "between" versus "directly between," "adjacent" versus "directly adjacent," etc.).

Throughout the specification, like reference numerals indicate like components. The terminology used herein is for the purpose of illustrating embodiments and is not intended to limit the present disclosure. In this specification, the singular form includes the plural sense, unless specified otherwise. The terms "comprises" and/or "comprising" used in this specification mean that the cited component, step, operation, and/or element does not exclude the presence or addition of one or more of other components, steps, operations, and/or elements.

Hereinafter, the present disclosure is described in detail with reference to the accompanying drawings.

Mood lighting may visually convey vehicle state information while the vehicle is traveling and may emotionally affect the brain waves of passengers to provide physical relaxation and psychological and mental stability.

In existing gradient mood lights, when the visible light of the sun having relatively very high brightness overlaps a reflected light for mood lighting in a vehicle traveling during the daytime, the reflected light is not recognized by passenger's eyes and the mood light fails to perform its function. In order to solve the problem, some methods, such as increasing the maximum brightness of LEDs used for mood lighting, increasing the number of LEDs, applying a member having a low reflectivity, or adding a shield structure, may be considered. However, these methods may cause deterioration of a controller of the mood light, increase material costs, decrease the luminance of indirect lighting, or have limitations in design, and thus cannot be ultimate solutions.

Furthermore, the existing gradient mood light has limitations in design. For instance, a degree of freedom in design is low because of shape restrictions due to a relationship between lighting and the reflective surface, differences in color and/or luminance depending on the material and color of the reflective surface, and mold modification needed when modifying the light. Moreover, on a black high-glossy member applied in the vehicle compartment, it is impossible to realize indirect gradient lighting due to the nature of the surface painting treatment.

For this reason, the present disclosure provides a lighting device capable of solving the above-mentioned problems and achieving a gradient lighting effect in indirect lighting by using a direct lighting method.

As illustrated in FIG. 1, the lighting device according to the present disclosure includes a light guide plate 20 and a member. The light guide plate 20 is configured to guide and diffuse a light L from a light source 10. The member includes a lighting area A1 to which the diffused light is radiated.

The lighting device may be an interior lighting device of a vehicle. In one implementation, the member is a garnish body 30. A garnish is a decorative member attached to an inner side or an outer side of the vehicle to enhance aesthetics. For example, the garnish may be attached to an instrument panel, a crash pad, a door, a console, and various trims of the vehicle. Generally, the garnish has a surface to which a wood grain film is attached or a painted surface to form a pattern on the exterior thereof. The garnish body 30 defining the exterior of the garnish may be mounted inside the vehicle for interior lighting. For example, the garnish body 30 may be mounted on a glove box, an instrument panel, a door, a console, etc., but not limited thereto.

Figure 2:
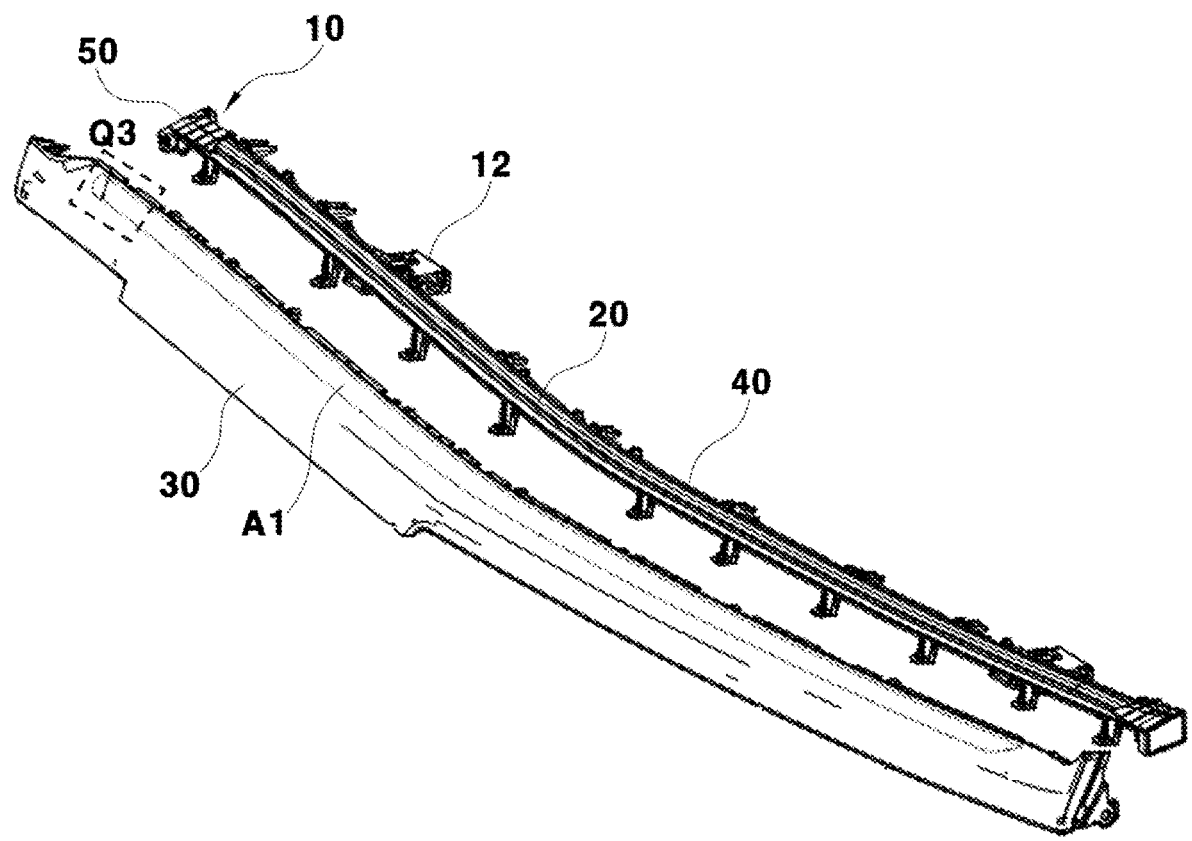
FIG. 2 is an exploded perspective view of a lighting device according to an embodiment of the present disclosure.
Figure 3:
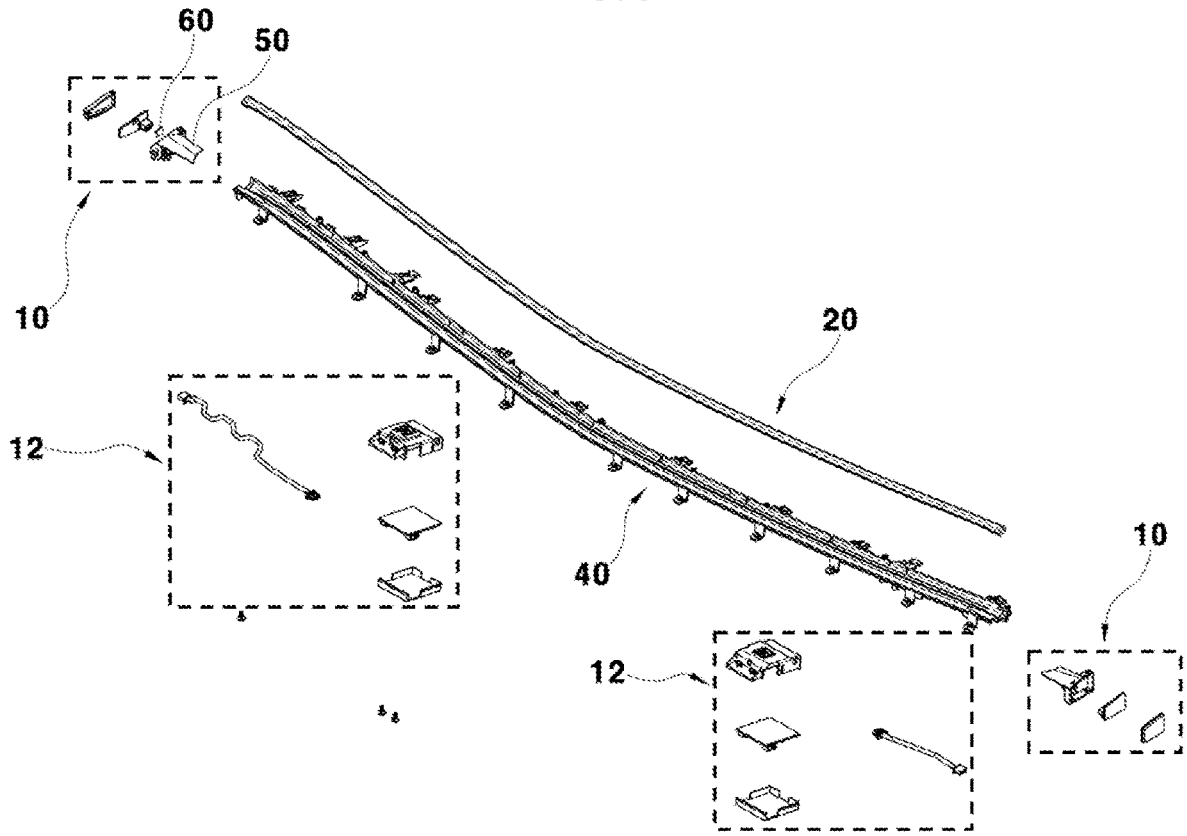
FIG. 3 is an exploded perspective view of a lighting device according to an embodiment of the present disclosure, without a garnish body.

Additionally Referring to FIGS. 2 and 3, illustrated the is lighting device according to one implementation of the present disclosure. The light guide plate 20 is accommodated in a housing 40. The housing 40 is mounted on the garnish body 30. The light guide plate 20 includes longitudinal opposite ends at each of which the light source 10 is mounted, respectively. The operation of the light source 10 may be controlled by a controller 12 communicatively coupled to the light source 10. The light L from the light source 10 may be radiated to the lighting area A1, provided on the garnish body 30, while moving through the light guide plate 20. The lighting area A1 may be provided on a surface of the garnish body 30, and the light of the lighting area A1 may be perceived from outside, i.e., from a vehicle compartment.

Figure 4:
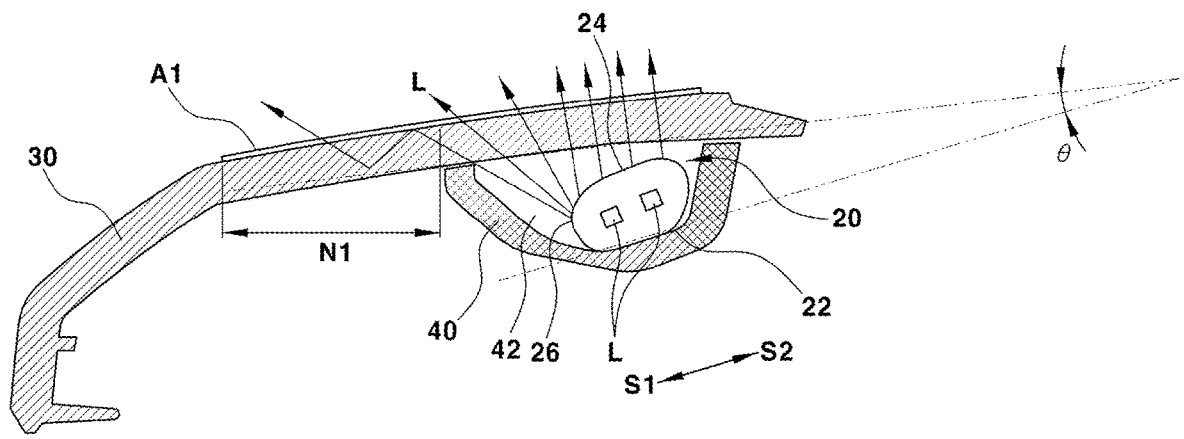
FIG. 4 is a cross-sectional view taken along line Q1-Q1 in FIG. 1, illustrating a lighting device according to an embodiment of the present disclosure.

More specifically, as illustrated in FIG. 4, the light guide plate 20 may be mounted to the garnish body 30 using the housing 40. The housing 40 may be mounted to the garnish body 30, and the light guide plate 20 may be accommodated in a space 42 defined in the housing 40. The housing 40 is not limited to have a predetermined shape but may have, for example, a substantially semicircular shape. Furthermore, the housing 40 may be a reflector.

The light L passing through the light guide plate 20 is output from the light source 10. In one implementation, the light source 10 may be a light-emitting diode (LED) or may be a red, green, and blue (RGB) LED. The light L may be emitted while being guided through the light guide plate 20 and may be radiated to the lighting area A1 through the garnish body 30.

According to one implementation of the present disclosure, the light guide plate 20 is disposed to have a predetermined angle θ with respect to the garnish body 30. In other words, the light guide plate 20 and the garnish body 30 may not be parallel with each other. When the light guide plate 20 is disposed to have an inclination with respect to the garnish body 30, the distance between a first side S1 of the light guide plate 20 and the garnish body 30 becomes greater than the distance between a second side S2 of the light guide plate 20 and the garnish body 30. Therefore, a path of the light L from each side of the light guide plate 20 to the lighting area A1 varies. In other words, a path of the light radiated from the first side S1 of the light guide plate 20 becomes longer than a path of the light radiated from the second side S2. As such, the intensity of the light L radiated to the lighting area A1 varies along the lighting area A1, and thus the light may be darker in an area where the light is radiated relatively far from the light guide plate 20. Therefore, a gradient lighting effect in which the light emitted from the lighting area A1 becomes darker or brighter from one side to another side may be achieved. In the illustrated implementation, the brightness of light in the lighting area A1 may decrease from S2 to S1. As such, according to the present disclosure, a gradient lighting effect in indirect lighting may be achieved using a direct lighting method.

The light guide plate 20 may include a mounting surface 22 and an inclined surface 24. The mounting surface 22 is mounted on an inner surface of the housing 40. The inclined surface 24 is disposed to face the mounting surface 22 and is inclined with respect to the garnish body 30. In the illustrated implementation, although the mounting surface 22 and the inclined surface 24 are shown to be parallel with each other, they are not limited thereto, and it is sufficient as long as the inclined surface 24 is inclined with respect to the garnish body 30.

At least one end portion of the light guide plate 20, i.e., at least one of the first side S1 and the second side S2 may include a curved surface 26. The curved surface 26 may spread and diffuse the light radiated from the light source 10, increasing the light efficiency and reinforcing the gradient lighting effect. The inclined surface 24 of the light guide plate 20 is formed substantially flat so that the light is directly radiated thereto, On the other hand, the curved surface 26 allows the light to be spread and diffused softly. In the illustrated implementation, the position of the curved surface 26 on the light guide plate 20 may be a portion of the inclined surface 24 disposed farthest from the garnish body 30. In other words, in the drawing, it may be described that the first side S1 of the inclined surface 24 includes the curved surface 26.

The light spread and diffused softly may be diffused to the lighting area A1 through a relatively long distance light path, thereby exhibiting the gradient lighting effect in which the illumination becomes darker from one side to the other side (from S2 to S1 in the drawing) of the lighting area A1. In other words, the present implementation provides an advantage in that the gradient lighting effect in indirect lighting is achieved using the direct lighting method in which the light L is directly radiated to the garnish body 30. Eventually, the gradient lighting effect may create an ambience using mood lighting in a vehicle compartment.

Figure 5:
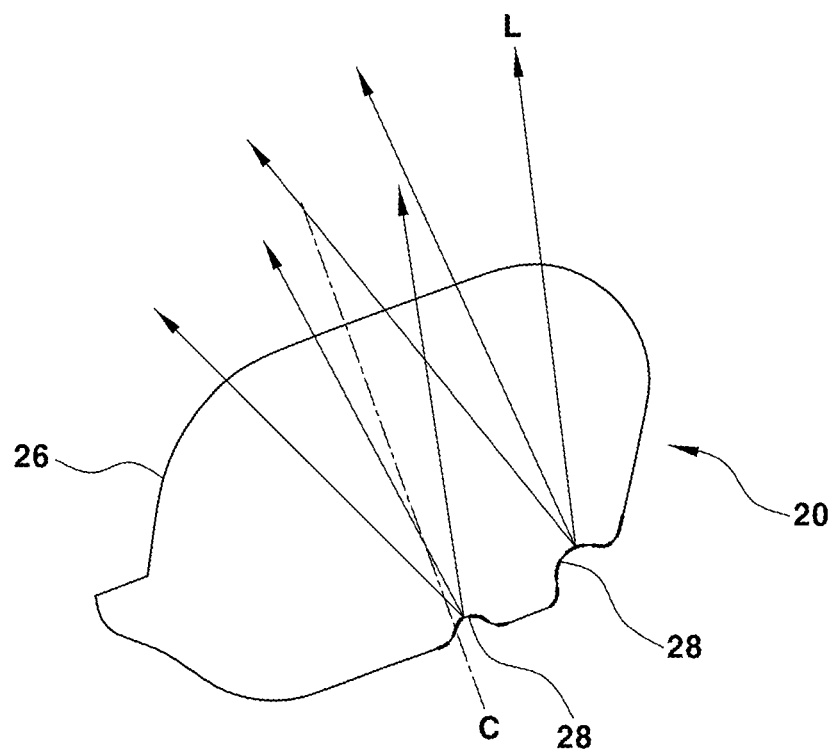
FIG. 5 illustrates a light guide plate of a lighting device according to an implementation of the present disclosure.

Referring to FIG. 5, according to some implementations of the present disclosure, the light guide plate 20 may include an optical structure 28. For example, the optical structure 28 may be formed at a lower surface of the light guide plate 20 or may be formed at a surface farthest from the garnish body 30. In some implementations, the optical structure 28 may have a shape recessed inward. The optical structure 28 may control the amount of diffusely reflected light emitted from the light guide plate 20. Specifically, the amount of diffusely reflected light may be controlled by adjusting the size of the optical structure 28 in the light guide plate 20. In one implementation, the amount of light may be controlled by adjusting the position of the optical structure 28 in the light guide plate 20. The optical structure 28 may be arranged to be eccentric with respect to a center line C of the light guide plate 20 so that the amount of light may be controlled for each section of the light guide plate 20.

Figure 6A:
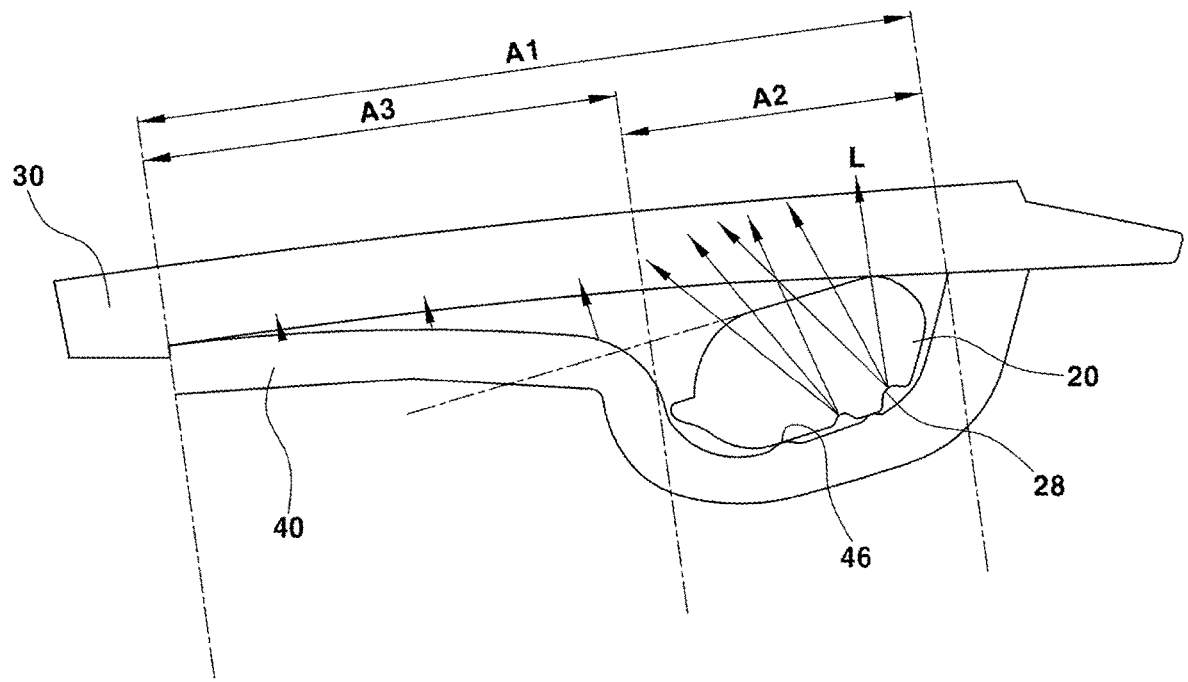
FIG. 6A illustrates a lighting device according to a different embodiment of the present disclosure.

As illustrated in FIG. 6A, the light L generated from the light source 10 is diffusely reflected through the light guide plate 20. The diffusely reflected light may be diffused to the lighting area A1 of the garnish body 30. Here, the amount of light diffused to the garnish body 30 may increase when the optical structure 28 of the light guide plate 20 is large and may decrease when the optical structure 28 of the light guide plate 20 is small. Furthermore, the luminance varies depending on the position of the optical structure 28. Therefore, according to the present disclosure, the luminance and/or the amount of light diffused to the garnish body 30 may be adjusted in the process of designing the lighting device, increasing the degree of freedom in design and preventing a decrease in luminance due to a loss of light to thereby allow proper indirect lighting even in bright surroundings, such as during the daytime.

According to some implementations of the present disclosure, the optical structure 28 may vary in size in a longitudinal direction of the light guide plate 20. For example, the optical structure 28 may be formed in the light guide plate 20 such that the optical structure 28 decreases in size from a longitudinal center to longitudinal ends of the light guide plate 20. Furthermore, in one implementation, the optical structure 28 may not be formed at the longitudinal ends of the light guide plate 20, i.e., a portion of the light guide plate 20 close to the light source 10. With this design of the optical structure 28, the light emitted from the lighting area A1 may be gradually weakened from the center to the end of the lighting area A1 in the longitudinal direction thereof, maximizing the gradient lighting effect.

Figure 6B:
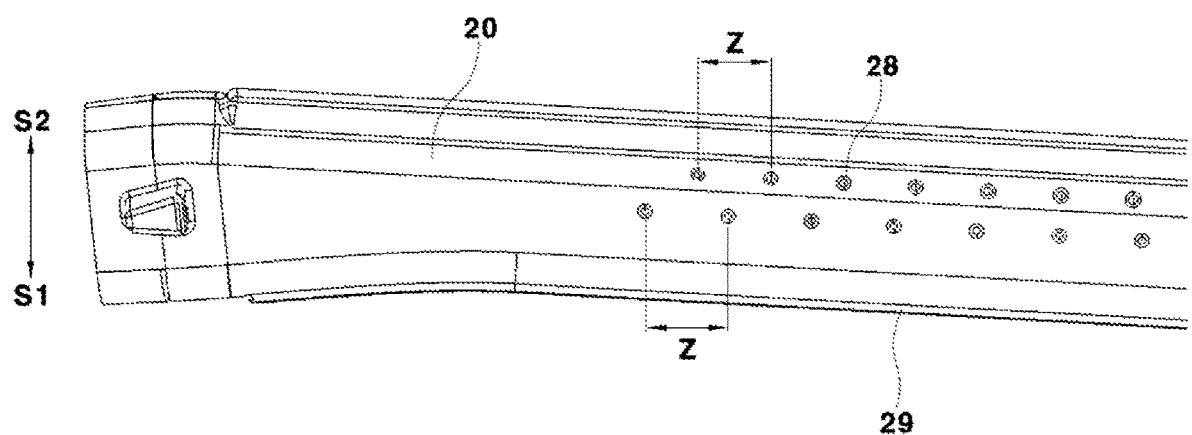
FIG. 6B illustrates a light guide plate of a lighting device according to an implementation of the present disclosure.

According to some implementations of the present disclosure, the optical structure 28 may vary in size in a width direction (or S1-S2 direction) of the light guide plate 20. The optical structure 28 at the brighter area S2 side may be greater in size than the optical structure 28 at the darker area S1 side. Referring to FIG. 6B, in some implementations, the pitch z between the optical structures 28 in a first row or at the brighter area S2 side and the pitch z between the optical structures 28 in a second row or at the darker area S1 side may be different from each other. For example, the pitch z between the optical structures 28 at the darker area S1 side may be greater than the pitch z between the optical structures 28 at the brighter area S2 side. With this design of the optical structure 28, the light may be gradually weakened from the brighter area S2 to the darker area S1 on the lighting area A1, maximizing the gradient lighting effect.

According to some implementations of the present disclosure, the light guide plate 20 includes a positioning rib 29. The positioning rib 29 may fix the light guide plate 20 in place in the housing 40. In order to achieve a curved gradient lighting effect, it is important that the entire light guide plate 20 maintains uniform luminance. The positioning rib 29 of the light guide plate 20 prevents the light guide plate 20 from being twisted or shaken, thereby maintaining uniform luminance in both the longitudinal direction and the width direction of the lighting area A1.

Figure 6C:
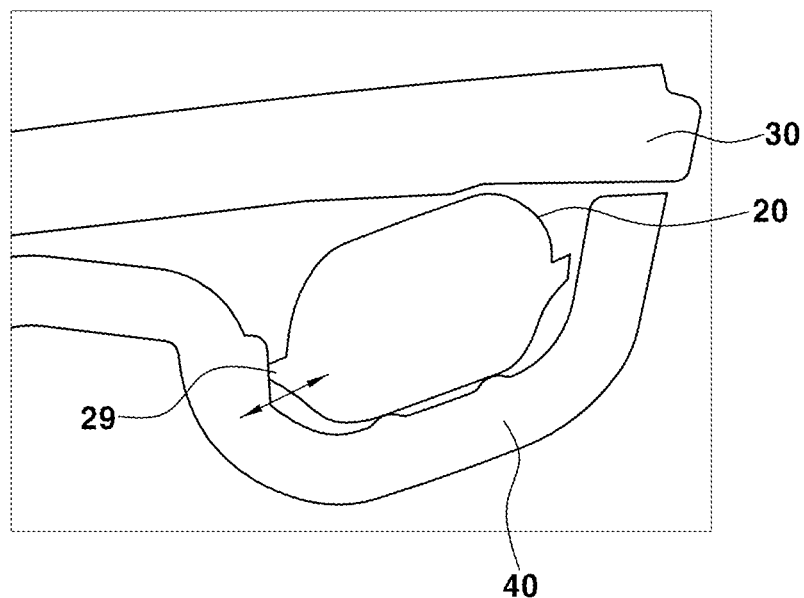
FIGS. 6C and 6D illustrate a lighting device according to a still different embodiment of the present disclosure.
Figure 6D:
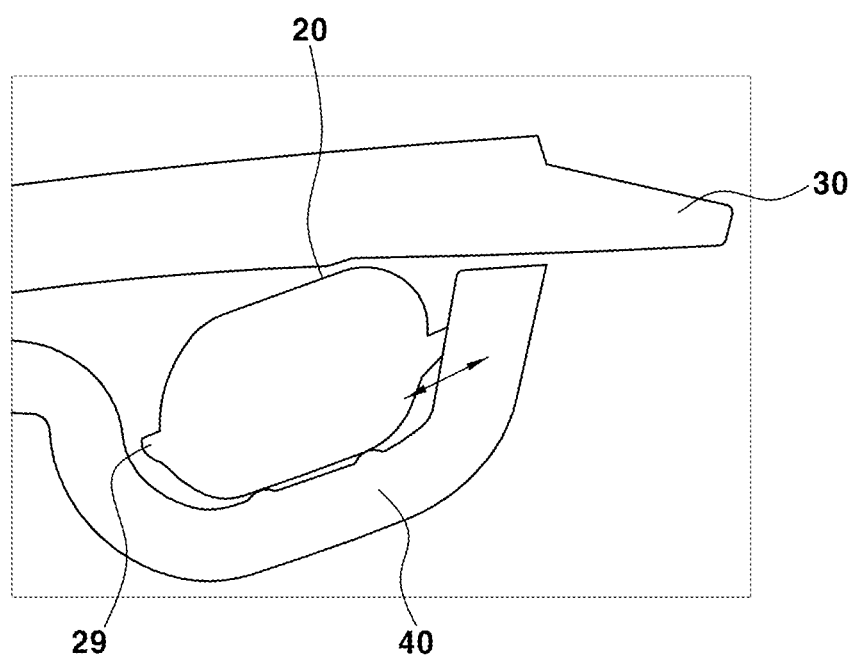

Referring to FIGS. 6C and 6D, the positioning rib 29 may be formed at each of opposite sides of the light guide plate 20 in the width direction (or S1-S2 direction) thereof. The positioning rib 29 may restrict a forward and rearward movement of the light guide plate 20 in the housing 40. When irregular protrusions are provided on the light guide plate 20, light bounces from the irregular protrusions, rendering it difficult to implement uniform luminance. According to the present disclosure, the positioning ribs 29 are formed at opposite sides of the light guide plate 20 in the width direction or at the front and the rear of the light guide plate 20, respectively, and are formed on at least a portion of the light guide plate 20 in the longitudinal direction or all along the light guide plate 20 in the longitudinal direction thereof, preventing light bounce or hot spots.

Figure 6E:
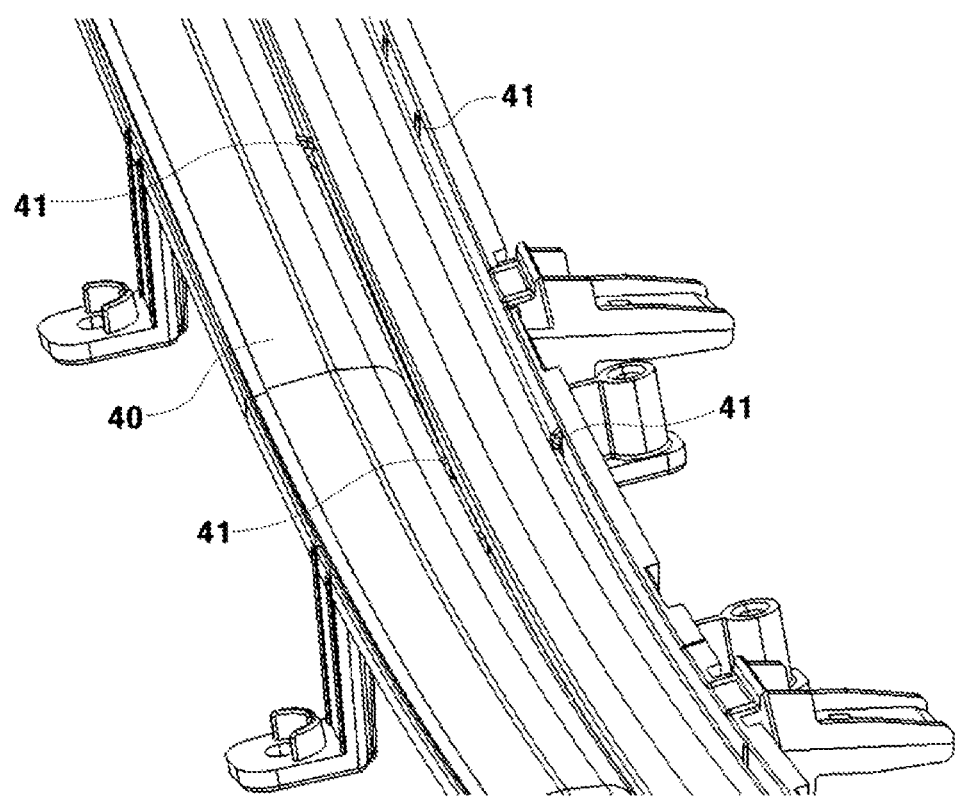
FIG. 6E illustrates a housing of a lighting device according to an implementation of the present disclosure.

Referring to FIG. 6E, according to some implementations of the present disclosure, the housing 40 includes a support rib 41. The support rib 41 may include a plurality of the support ribs 41, and the plurality of the support ribs may be spaced apart from each other by a predetermined distance in the housing 40. For example, the support rib 41 may protrude toward the space 42 in the housing 40. The support rib 41 is not limited to have the shape described above but may have any shape as long as the support rib 41 is operable in association with the positioning rib 29.

Figure 6F:
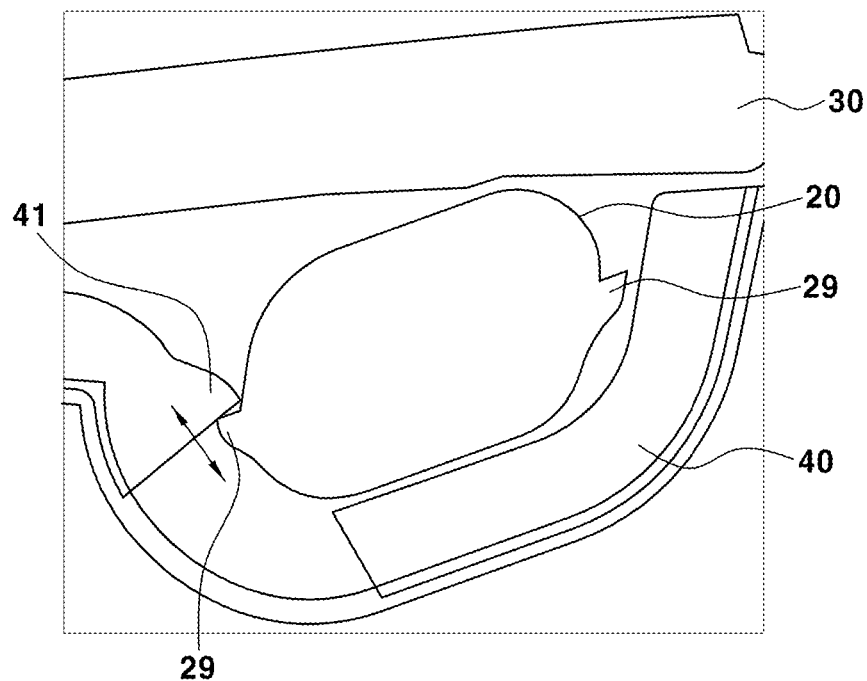
FIGS. 6F and 6G illustrate a lighting device according to a still different embodiment of the present disclosure.
Figure 6G:
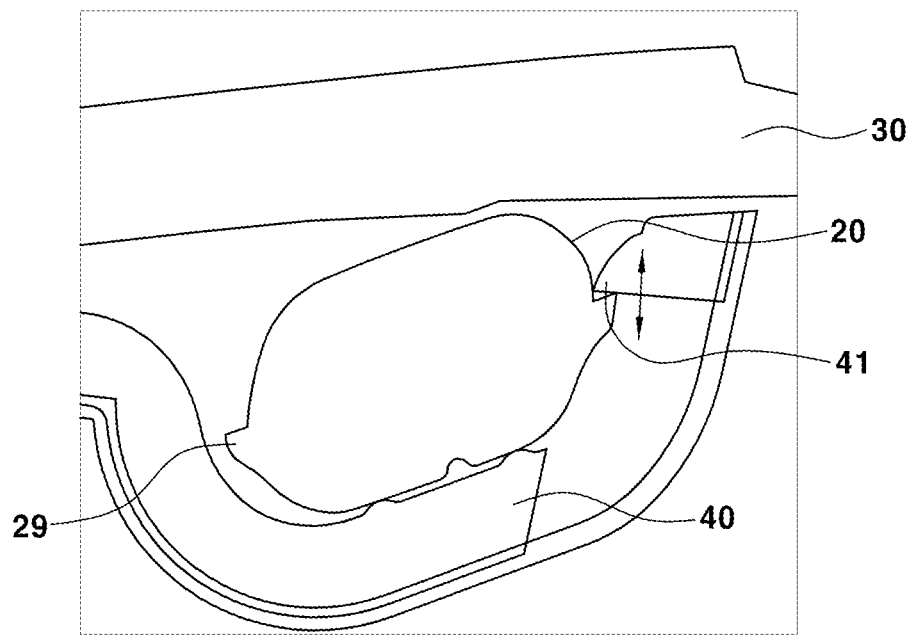

As illustrated in FIGS. 6F and 6G, the support rib 41 may fix the positioning rib 29 in place or may be mated with the positioning rib 29 to limit vertical movement of the light guide plate 20 within the housing 40. The support rib 41 may prevent a main lighting direction of the light source from being changed when the light guide plate 20 is twisted or shaken.

Referring back to FIG. 4 again, according to some implementations of the present disclosure, the housing 40 may be mounted to the garnish body 30 by overlapping a portion of the lighting area A1 of the garnish body 30. More specifically, the housing 40 does not have a size corresponding to the entire lighting area A1 of the garnish body 30, and the inner surface of the garnish body 30 may have a non-mounting area N1, an area where the housing 40 is not mounted to the garnish body 30. In other words, the lighting area A1 has a mounting area, to which the housing is mounted, and the non-mounting area N1, whereby the light emitted from the light source 10 may be radiated to the lighting area A1 through a relatively long distance light path. With the housing 40 mounted in this way, a path of the light emitted from the light source 10 and directed to the lighting area A1 may be set variously by the above described inclined structure of the light guide plate 20, casting the light to be gradually dimmed over the lighting area A1.

As illustrated in FIG. 6A, according to a different implementation of the present disclosure, the housing 40 may overlap the entire lighting area A1 of the garnish body 30. In other words, the path of light may be easily controlled by changing the shape of the housing 40.

According to some implementations of the present disclosure, the housing 40 may include a protrusion 46. The protrusion 46 may be formed at a portion of the housing brought into contact with the light guide plate 20. The protrusion 46 may protrude from the housing 40 and may include a plurality of the protrusions 46. When the light guide plate 20 is mounted in the housing 40, the light guide plate 20 is separated from the housing 40 by the protrusion 46, increasing the light efficiency through the light guide plate 20.

The protrusion 46 may create a line contact between the housing 40 and the light guide plate 20 to minimize the contact area therebetween while limiting the position of the light guide plate 20 so that the light guide plate 20 is kept in place and does not change the disposed direction thereof. The protrusion 46 may allow the light guide plate 20, which may have a small width and a long length (e.g., 1 meter or greater), to be disposed at a predetermined angle such that the light guide plate 20 keeps its position even when the vehicle is traveling. In addition, the protrusion 46 may prevent noise (buzz, squeak, and rattle) caused by friction.

Figure 7A:
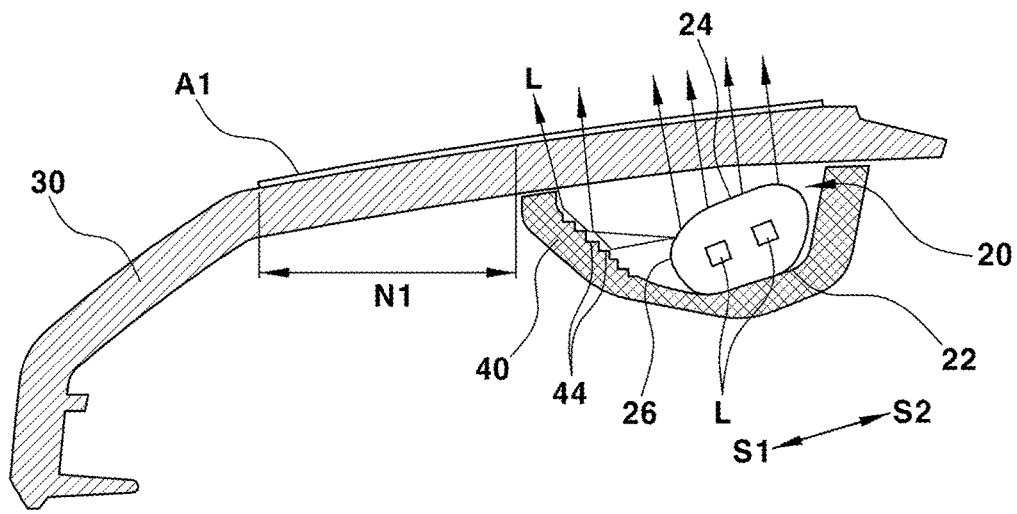
FIG. 7A illustrates a lighting device according to a still different embodiment of the present disclosure.

Referring to FIG. 7A, the housing 40 may include a reflective surface 44. The reflective surface 44 may induce scattering of light emitted from the light guide plate 20. The reflective surface 44 may reflect the light from the light guide plate 20 such that the path of the light is changed upward, inducing scattering of light. In this way, the gradient lighting effect may be reinforced.

In one implementation, the reflective surface 44 may have a stepped shape and may be formed on an inner sidewall of the housing 40. It can be clearly appreciated that the reflective surface 44 is not limited to have a stepped shape but to have any shape as long as the reflective surface 44 may reflect the light and guide it upward. For example, the reflective surface 44 may have a stepped shape but may partially have a curved surface.

Figure 7B:
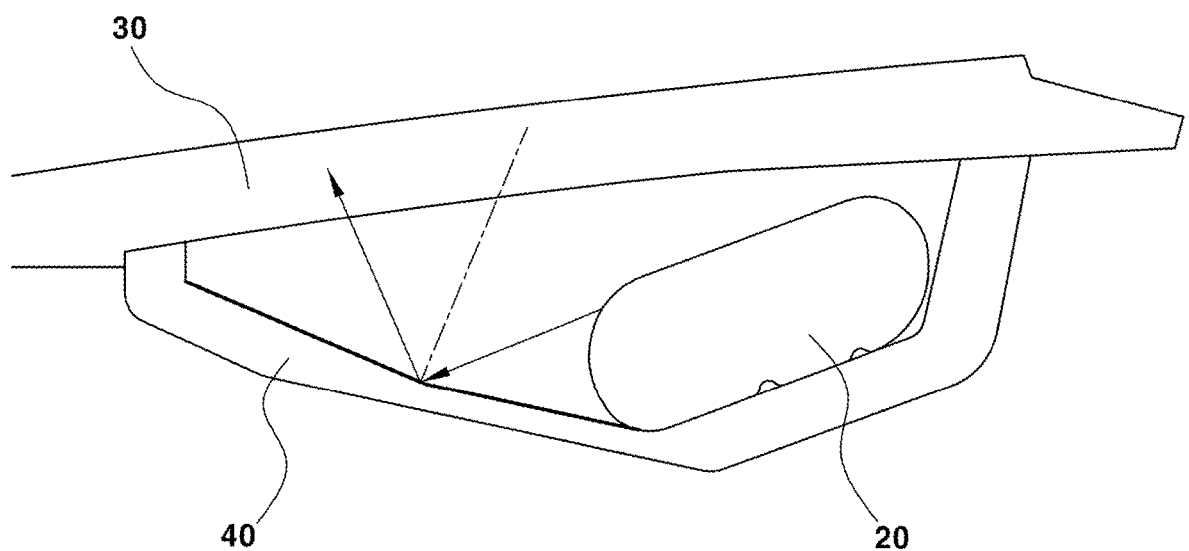
FIG. 7B illustrates a lighting device according to a still different embodiment of the present disclosure.
Figure 7C:
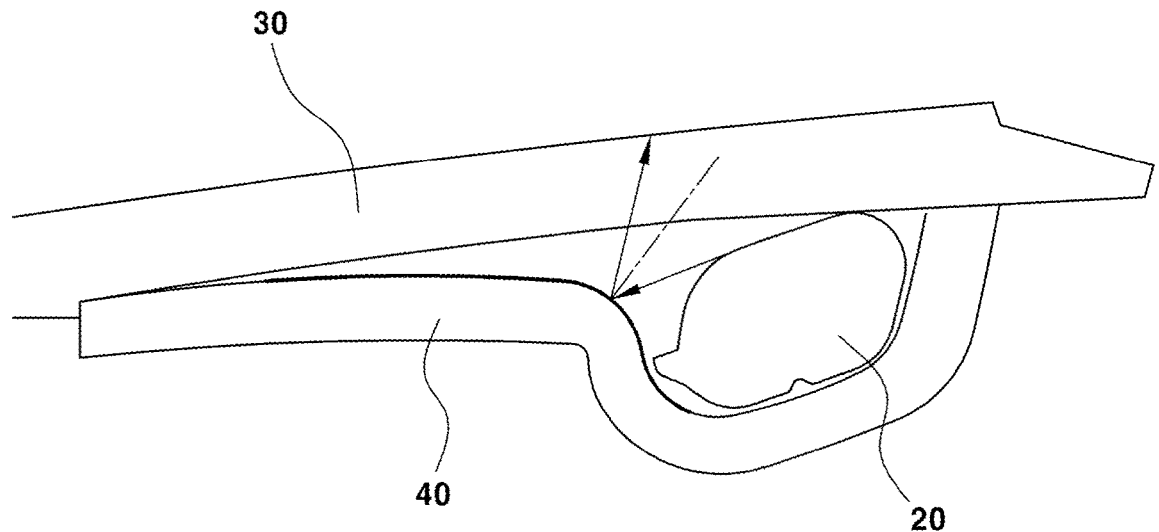
FIG. 7C illustrates a lighting device according to a still different embodiment of the present disclosure.

As illustrated in FIGS. 7B and 7C, the reflective surface 44 may vary in curvature in addition to the variation in shape. In order for a physical decrease in luminance using the phase difference between the light guide plate 20 and the lighting area A1, the curvature of the reflective surface 44 may be modulated to adjust the lighting area A1 and the degree of the gradient lighting effect.

According to some implementations of the present disclosure, the garnish body 30 includes a plurality of holes 32. Each hole 32 may be formed in fine size.

Figure 8:
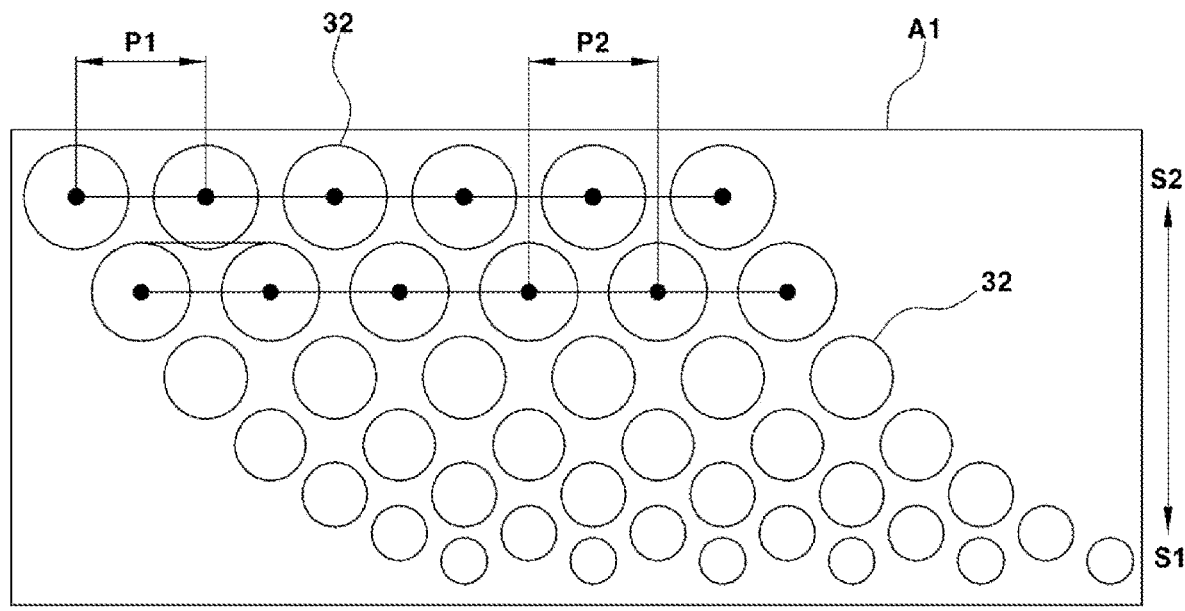
FIG. 8 illustrates a lighting area of a lighting device according to one implementation of the present disclosure.

As illustrated in FIG. 8, the plurality of the holes 32 through which light passes may be arranged in a plurality of columns and rows in the lighting area A1 on the garnish body 30. Conventionally, the holes 32 are arranged to have an equal size. However, in the present implementation, the holes 32 may be arranged to have different sizes for each row. Of course, the holes 32 may be arranged to have different sizes for each column depending on the type of arrangement.

For example, the holes 32 may be formed to decrease in size from the first row (the uppermost row in the drawing) to the next row (downward direction in the drawing). Referring to the drawing, a hole 32 having the largest size in the first row may be disposed at the rightmost side (S2 side) of the lighting area A1, and a hole 32 having the smallest size in the lowest row may be disposed at the leftmost side (S1 side) of the lighting area A1. In other words, the holes 32 may decrease in size in a direction toward S1. With such a size and shape, the left lighting area A1 in the illustrated implementation emits the darkest light, maximizing the gradient lighting effect.

In some implementations, the holes 32 may vary in size by row or column, but pitches P1 and P2 (collectively, P) of the holes 32 disposed in the same row may be equal. The pitches P1 of the holes 32 disposed in the first row R1 may be equal, the pitches P2 of the holes 32 disposed in the second row R2 may be equal, and the pitches in the rows therebelow may also be equal for the same row. As such, when the pitches are equal for each row, the holes 32 in a different row may be arranged to cut in between the holes 32 in each row.

Figure 9:
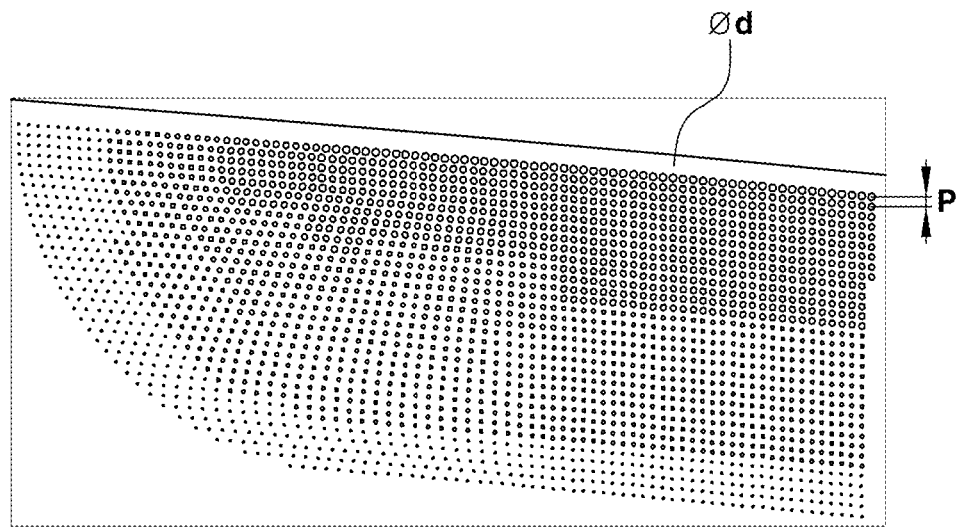
FIG. 9 illustrates a lighting area of a lighting device according to a different implementation of the present disclosure.

As illustrated in FIG. 9, according to some implementations of the present disclosure, the holes 32 decrease in size Φd from one side to the other side (from S2, brighter area, to S1, darker area, in the illustrated implementation) on the lighting area A1. Moreover, according to an implementation of the present disclosure, the holes 32 may increase in pitch P, between the holes 32 next to each other, from one side to the other side (from S2 to S1 in the illustrated implementation) on the lighting area A1. Furthermore, the holes 32 may decrease in size toward the longitudinal ends of the garnish body 30 and/or may increase in pitch P, between the holes 32 next to each other, toward the longitudinal ends of the garnish body 30. In one implementation, the holes 32 may be formed through laser machining.

A portion of the garnish body 30 where the hole is formed does not necessarily have a thickness of 0. The garnish body 30 may have formed therein hole-like recesses to create a hidden lighting effect in which holes are not visible from the outside (not shown in the drawing).

Figure 10:
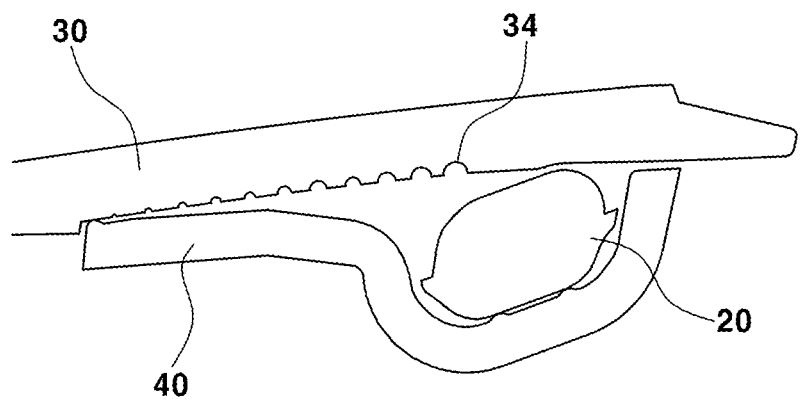
FIG. 10 illustrates a lighting device according to a still different embodiment of the present disclosure.

Referring to FIG. 10, according to some implementations of the present disclosure, the garnish body 30 may include an optical pattern 34. The optical pattern 34 may be formed on a surface of the garnish body 30 brought into direct contact with the housing 40. Each element of the optical pattern 34 may have a different size to vary the degree of scattering of light, reinforcing the gradient lighting effect. For example, as in the illustrated implementation, the optical pattern 34 recessed in the garnish body 30 may decrease in size in a direction from S2 to S1.

Figure 11:
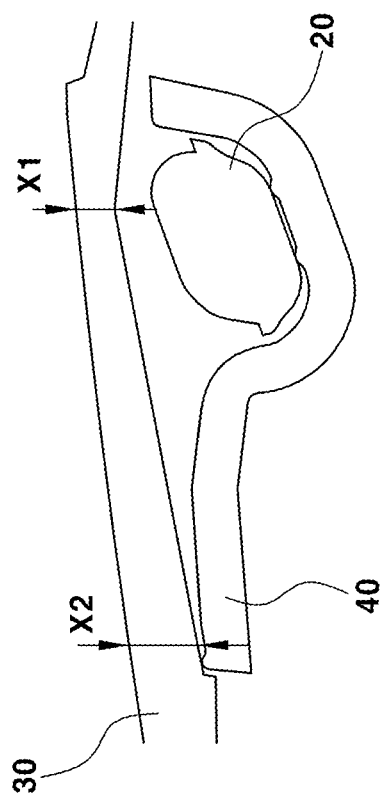
FIG. 11 illustrates a lighting device according to a still different embodiment of the present disclosure.

Referring to FIG. 11, according to some implementations of the present disclosure, the garnish body 30 may vary in thickness. The variation in thickness of the garnish body 30 induces a difference in light transmittance, reinforcing the gradient lighting effect. As in the illustrated implementation, a thickness X1 of the garnish body 30 at the brighter side may be smaller than a thickness X2 of the garnish body 30 at the darker side. Moreover, the garnish body 30 may gradually increase in thickness from the brighter side to the darker side.

Referring back to FIGS. 2 and 3 again, according to the present disclosure, the lighting device may further include a screen member 50. The screen member 50 may reduce the amount of light from the light guide plate 20 in order to achieve the gradient lighting effect at an end portion of the lighting device.

According to an implementation of the present disclosure, the lighting device may include an inner lens 60. The inner lens 60 may be disposed at a front side of the light source 10. The inner lens 60 may protect the light source 10 and may change the main lighting direction of the light source 10.

According to the present disclosure, provided is a lighting device configured to achieve the gradient lighting effect by adjusting at least one of an air gap between the garnish body 30 and the light guide plate 20, the size of the holes 32, and the pitch P between the holes 32. As the air gap decreases, as the size of the holes 32 increases, and as the pitch P between the holes 32 decreases, the amount of light may increase and the illumination may become brighter. Conversely, as the air gap increases, as the size of the holes 32 decreases, and as the pitch P between the holes 32 increases, the amount of light may decrease and the illumination may become darker. As such, at the S2 side which is the brighter side in the gradient lighting, the air gap may be small, the size of the holes 32 may be large, and the pitch P between the holes 32 may be small. Conversely, at the S1 side which is the darker side in the gradient lighting, the air gap may be large, the size of the holes 32 may be small, and the pitch P between the holes 32 may be large.

The lighting device according to the present disclosure may secure lighting functionality by improving daytime visibility for indirect gradient lighting.

The lighting device according to the present disclosure may achieve uniform gradient lighting on any member regardless of the type of the surface thereof. The lighting device may be applied in any surface of members processed by various methods such as general painting, half mirror method, ion vacuum deposition, and insert film, as well as a black high gloss surface.

According to the present disclosure, the lighting device may secure a luminance value and quality higher than that of the conventional indirect gradient lighting when observed with the naked eye.

The lighting device according to the present disclosure is easy to be designed by having a simplified structure not affected by the shape, material, color, etc. of a member serving as a reflective surface.

The lighting device according to the present disclosure may reduce investment costs by making it possible to modify the size, pitch, width, length, etc. of a hole formed therein without modifying the mold thereof.

Furthermore, the lighting device according to the present disclosure may solve the problem of reflection on the outside mirror during nighttime traveling of a vehicle by using the gradient lighting effect.

As is apparent from the above description, the present disclosure provides the following effects.

The present disclosure provides a lighting device capable of providing a rich and varied indoor atmosphere using a gradient lighting effect.

Moreover, the present disclosure provides a lighting device capable of securing the visibility for mood lighting in a daytime outdoor environment where the visibility for lighting is poor.

Furthermore, the present disclosure provides a lighting device capable of enhancing the emotional quality of a vehicle.

According to the present disclosure, a lighting device exhibiting excellent performance in space utilization is proposed.

Effects of the present disclosure are not limited to what has been described above, and other effects not mentioned herein will be clearly recognized by those skilled in the art based on the above description.

It will be apparent to those of ordinary skill in the art to which the present disclosure pertains that the present disclosure described above is not limited by the above-described embodiments and the accompanying drawings, and various substitutions, modifications and changes are possible within a range that does not depart from the technical idea of the present disclosure.

The invention claimed is:
1. A lighting device, comprising:
   a light guide plate configured to guide and diffuse a light from a light source; and
   a garnish body comprising a lighting area to which the diffused light is radiated, wherein the light guide plate is disposed at a predetermined angle with respect to the garnish body, wherein the lighting area of the garnish body comprises a plurality of holes formed in one or more columns and rows.

2. The lighting device of claim 1, further comprising a housing configured to accommodate therein the light guide plate and connected to the garnish body, wherein the housing is a reflector.

3. The lighting device of claim 1, wherein the light guide plate comprises an optical structure configured to adjust an amount of the light being diffusely reflected.

4. The lighting device of claim 3, wherein the optical structure is disposed eccentrically with respect to a center line of the light guide plate.

5. The lighting device of claim 3, wherein the optical structure is configured to vary either in size or in pitch or both over the light guide plate.

6. The lighting device of claim 3, further comprising a housing configured to accommodate therein the light guide plate and connected to the garnish body, wherein:
the light guide plate comprises a positioning rib protruding from the light guide plate, and
the housing comprises a support rib operable in association with the positioning rib.

7. The lighting device of claim 1, wherein the light guide plate comprises a curved surface.

8. The lighting device of claim 7, wherein the curved surface is formed on a portion of the light guide plate where a distance between the garnish body and the light guide plate is largest.

9. A vehicle, comprising the lighting device of claim 1.

10. The lighting device of claim 1, wherein:
the plurality of the holes decrease in size from a position where a distance between the garnish body and the light guide plate is smallest to a position where the distance between the garnish body and the light guide plate is largest; or
pitches between the plurality of the holes increase from a position where the distance between the garnish body and the light guide plate is smallest to a position where the distance between the garnish body and the light guide plate is largest.

11. The lighting device of claim 1, wherein:
the plurality of the holes decrease in size toward longitudinal ends of the garnish body; or
the plurality of the holes increase in pitch toward the longitudinal ends of the garnish body.

12. A lighting device, comprising:
a light guide plate configured to guide and diffuse a light from a light source; and
a garnish body comprising a lighting area to which the diffused light is radiated,
wherein the light guide plate is disposed at a predetermined angle with respect to the garnish body wherein the garnish body comprises an optical pattern, wherein the optical pattern is formed in at least one portion of a surface of the garnish body in contact with the light guide plate.

13. The lighting device of claim 12, wherein the optical pattern decreases in size from an area where the garnish body overlaps the light guide plate to an area where the garnish body does not overlap the light guide plate.

14. The lighting device of claim 1, wherein the light source is disposed at longitudinal ends of the light guide plate.

15. The lighting device of claim 14, wherein a screen member is disposed at each longitudinal end of the light guide plate to cover the light guide plate.

16. The lighting device of claim 1, wherein an inner lens configured to protect the light source is disposed at a front surface.

17. The lighting device of claim 2, wherein the housing comprises a reflective surface having a stepped shape.

18. The lighting device of claim 2, wherein the housing comprises at least one protrusion protruding toward a space in the housing.

19. A lighting device, comprising:
a light guide plate configured to guide and diffuse a light from a light source;
a garnish body comprising a lighting area to which the diffused light is radiated; and
a housing configured to accommodate therein the light guide plate and connected to the garnish body, wherein the housing is a reflector,
wherein the light guide plate is disposed at a predetermined angle with respect to the garnish body and wherein at least a portion of or all of the housing is positioned to overlap with the lighting area of the garnish body.

* * * * *